(12) United States Patent
Park et al.

(10) Patent No.: US 10,354,401 B2
(45) Date of Patent: Jul. 16, 2019

(54) DISTANCE MEASUREMENT METHOD USING VISION SENSOR DATABASE

(71) Applicant: Industry Academic Cooperation Foundation of Yeungnam University, Gyeongsan-si, Gyeongsangbuk-do (KR)

(72) Inventors: Yong Wan Park, Daegu (KR); Soo Jung Hur, Daegu (KR); Jin Seon Song, Daegu (KR); Chang Hwan Choi, Pohang-si (KR)

(73) Assignee: INDUSTRY ACADEMIC COOPERATION FOUNDATION OF YEUNGNAM UNIVERSITY (KR)

( * ) Notice: Subject to any disclaimer, the term of this patent is extended or adjusted under 35 U.S.C. 154(b) by 181 days.

(21) Appl. No.: 15/118,458

(22) PCT Filed: Feb. 6, 2015

(86) PCT No.: PCT/KR2015/001261
§ 371 (c)(1),
(2) Date: Feb. 10, 2017

(87) PCT Pub. No.: WO2015/122658
PCT Pub. Date: Aug. 20, 2015

(65) Prior Publication Data
US 2017/0221221 A1 Aug. 3, 2017

(30) Foreign Application Priority Data
Feb. 13, 2014 (KR) .................. 10-2014-0016593

(51) Int. Cl.
*G06T 7/60* (2017.01)
*G01C 3/00* (2006.01)
(Continued)

(52) U.S. Cl.
CPC .............. *G06T 7/60* (2013.01); *G01B 11/026* (2013.01); *G01C 3/00* (2013.01); *G06T 7/50* (2017.01); *G06T 7/75* (2017.01)

(58) Field of Classification Search
CPC . G06T 2207/30232; G06T 2207/30244; G06T 7/292; G06T 7/70; H04N 5/23206; H04N 5/23216; H04N 7/181
(Continued)

(56) References Cited

U.S. PATENT DOCUMENTS 7,191,056 B2 * 3/2007 Costello ............... G01C 21/005
348/117
9,177,404 B2 * 11/2015 Ramachandran ....... G06T 11/60
(Continued)

*Primary Examiner* — Thai Q Tran
*Assistant Examiner* — Stephen R Smith
(74) *Attorney, Agent, or Firm* — Womble Bond Dickinson (US) LLP

(57) ABSTRACT

The present disclosure is a method to measure the distance between the place where the first image is acquired and the target distance after comparing and analyzing the image acquired through vision sensor with the established database. The database stores images of each section and image information by using the vision sensor. The distance measuring method analyzes the characteristics of the images transmitted by a user and the characteristics of the objects on images, compares them with the database, selects the image most similar to the corresponding image from the database, and calculates the distance to the user.

5 Claims, 4 Drawing Sheets

(51) Int. Cl.
  *G01B 11/02*    (2006.01)
  *G06T 7/50*     (2017.01)
  *G06T 7/73*     (2017.01)

(58) Field of Classification Search
  USPC .......... 348/140, 135; 382/218; 701/400–541
  See application file for complete search history.

(56) References Cited

U.S. PATENT DOCUMENTS

| | | | |
|---|---|---|---|
| 9,324,003 B2* | 4/2016 | France | G01C 15/00 |
| 9,418,313 B2* | 8/2016 | Valente | G06K 9/46 |
| 9,903,719 B2* | 2/2018 | Hunter, Jr. | G06T 7/74 |
| 2005/0190972 A1* | 9/2005 | Thomas | G06K 9/209 |
| | | | 382/218 |
| 2012/0065811 A1* | 3/2012 | Nakamura | G01C 21/30 |
| | | | 701/1 |
| 2015/0292887 A1* | 10/2015 | Haglund | G01S 19/13 |
| | | | 701/468 |

* cited by examiner 5M  10M  15M  20M  25M  30M  35M  40M  45M  50M  Database

DISTANCE MEASUREMENT METHOD USING VISION SENSOR DATABASE

BACKGROUND

Technical Field

The present invention relates to a method of measuring the location of a user. More particularly, the present invention relates to a distance measuring method by comparing vision sensor images to database. Using this method, a distance measuring is possible without GPS, and it is possible to deduct depth values of target objects by a comparison of 2D side-section images to database information.

Background

The conventional methods of measuring the location of a user are a method for measuring location by using GPS (Global Positioning System) and a method for measuring the location of a user by applying triangulation based on mobile communication signals.

However, these conventional methods have numerous problems. In case of GPS, although it performs measuring of location outside with high accuracy, it does not work in particular environments such as indoors, the basement, and the downtown where GPS signals are blocked. And the measuring method based on mobile communication signals and triangulation is less accurate than GPS in measuring location and tends to be influenced by the surrounding environments of a user. Besides these methods, other distance measuring methods based on various forms of technology such as Wi-Fi and RFID have been suggested.

Meanwhile, with the recent development of optical technology, various distance measuring methods using vision sensor have been suggested. Representatively, in the case of stereo vision using binocular method, it measures distance to the target object by comparing images acquired through vision sensor. Another method for distance measuring is to measure distance to the target object by comparing the ratio of a particular object on side-section image acquired through single vision sensor and to provide a user with it. This method enables the development of various applications. In addition, there is an apparatus for expressing images in distance information by combining a ultra-red sensor and a vision sensor.

Each technology has advantages and disadvantages. The stereo vision using binocular method uses the method of reading images by two vision sensors and the distance measuring method by combining two images. As the stereo vision represents the distance difference by different angle of views of image information, it has a high accuracy in terms of positioning that represents relative distance. However, as the stereo vision represents only limited range of distances and it deals with two images at the same time, it has a difficulty in managing in real time due to high computational complexity.

The distance measuring method that measures the distance to the target object by comparing the ratio of a particular object on side-section image is successful in fixed and structured environments such as a standardized space, but the method may not be used in environments that are not standardized and structured since a successful result may not be expected in such environments.

The distance measuring method that acquires images and distance information at the same time by combining a ultra-red sensor and a vision sensor has less computational complexity compared to the stereo vision using binocular method and has an advantage of generating a successful result in the environments full of changes compared to the distance measuring method by comparing the ratio of a particular object on side-section image. However, it has a disadvantage in that it may be only used in restricted spaces in terms of distance as the reliability and accuracy of the distance information measured by infrared rays are drastically reduced when the distance to objects exceeds a regular scope.

SUMMARY

The stereo vision is costly as it uses a multiplicity of vision sensor instead of a single vision sensor and has less disposal facility as the computational complexity of distance measuring increases. Also, the distance of recognizing objects for the purpose of an accurate distance measuring is limited.

As the distance measuring method by comparing the ratio of a particular object on side-section image does a comparison of the ratio of a particular object, it is impossible to measure distance without a target object and the method is only used in restricted situations.

The present disclosure is directed to providing an efficient and accurate distance measuring to the target object with less computational complexity by comparing the extracted values of image characteristics previously built in the database to the extracted values of image characteristics acquired through the vision sensor.

Distance measuring method using vision sensor database according to an exemplary embodiment of the present disclosure provides the acquisition of real images by photographing outside environment using a vision sensor, the calculation of the component value of the real image characteristics, the selection of the reference image that has the component value most similar to the component value of the real image characteristic by referring to the database of the component value of reference images of the outside environments and the location information of the reference images, the acquisition of location information of the place where the real image is photographed based on the location information of the selected reference image, and the measurement of distance between the place where the real image is photographed and the target place based on the location information of the place where the real image is photographed and of the target place.

Distance measuring method using vision sensor according to an exemplary embodiment of the present disclosure further includes the direct transmission of the real image to the management server between the acquisition of the real image and the calculation of the real image characteristics.

Distance measuring method using vision sensor according to an exemplary embodiment of the present disclosure performs the calculation of the real image characteristics, the selection of the reference image, the acquisition of the location information, and the measurement of the distance on the management server.

Distance measuring method using vision sensor according to an exemplary embodiment of the present disclosure further includes the information offering to a user by processing information including the acquired location information and distance information after the measurement of distance.

Distance measuring method using vision sensor according to an exemplary embodiment of the present disclosure builds the database by the database establishment and the database establishment includes the acquisition of images by photographing each section of the outside environment, the calculation of the component value of the reference images, and the storage of the reference information by matching the component value of the reference images and the information of locations where the reference images are acquired.

The database establishment of distance measuring method using vision sensor according to an exemplary embodiment of the present disclosure further includes the estimation of change rules of the component value of the reference image characteristics after the calculation of the reference image characteristics.

The database establishment of distance measuring method using vision sensor according to an exemplary embodiment of the present disclosure further includes, after the storage of the reference information, the interpolation of sections between places where the reference images are photographed by calculating virtual characteristic component value according to the change rules estimated in the estimation stage and the updating of the database by matching the virtual characteristic component value with the information of the location where the virtual characteristic component value is calculated by interpolation.

In case of the stereo vision, it is costly as it uses a multiplicity of vision sensors instead of a single vision sensor and it does not perform well due to the increase in computational complexity for distance calculation. In addition, the recognizing distance of object is limited for the purpose of accurate calculation of distance.

In case of the distance measuring method by comparing the ratio of a particular object on side-section image, it is unable to calculate distance without a target object as it compares the ratio of a particular object and it may be only used in limited situations.

However, an exemplary embodiment of the present disclosure may reduce the computational complexity by comparing the component value of image characteristics acquired through a vision sensor with the component value of image previously built in the database and may calculate the distance to the target object effectively and accurately.

METHOD FOR CARRYING OUT THE INVENTION

Below is an explanation of an exemplary embodiment of the present invention by reference to the accompanying drawings.

Figure 1:
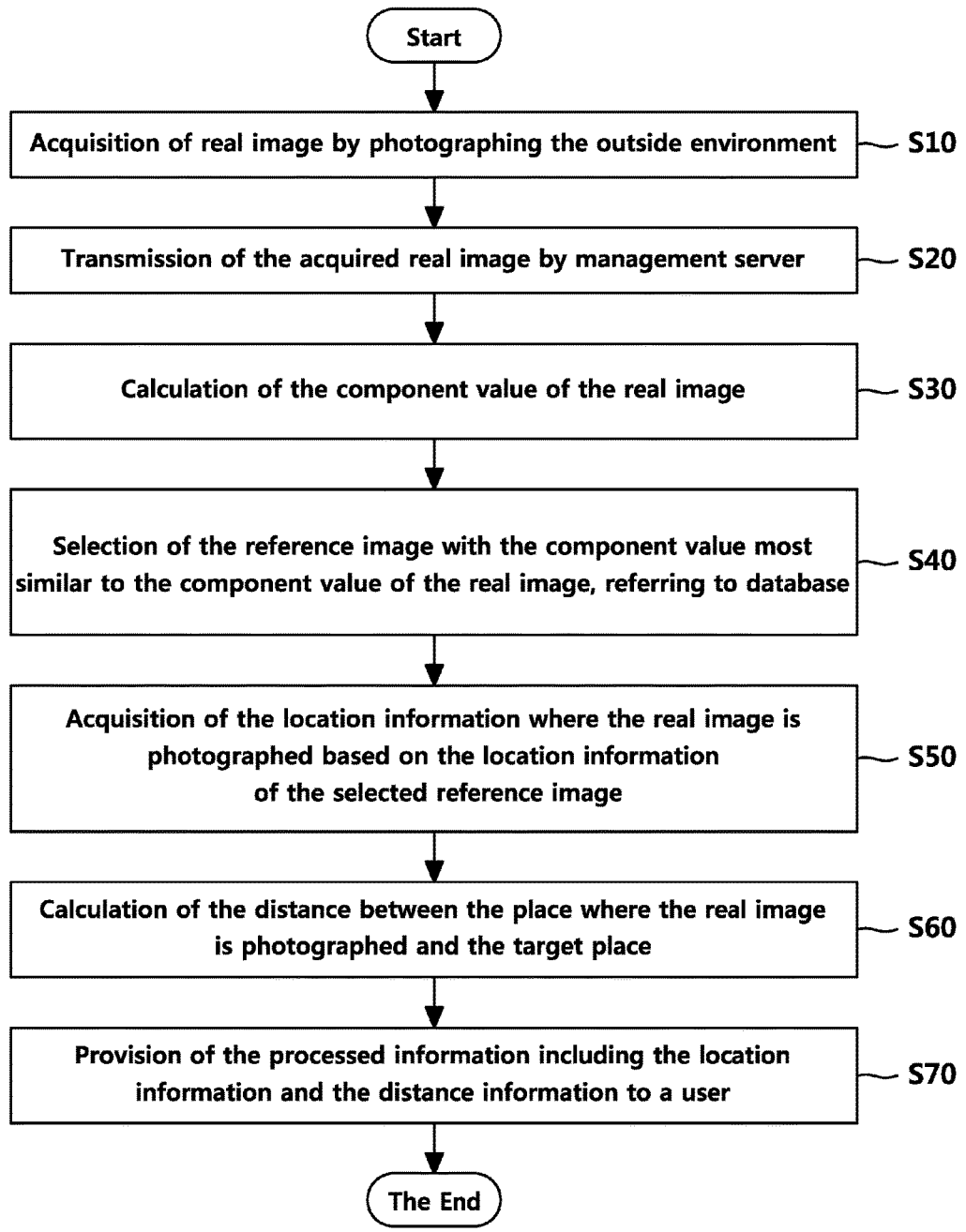
FIG. 1 is a sequence diagram illustrating the distance measuring method using vision sensor database according to an exemplary embodiment of the present disclosure.
Figure 2:
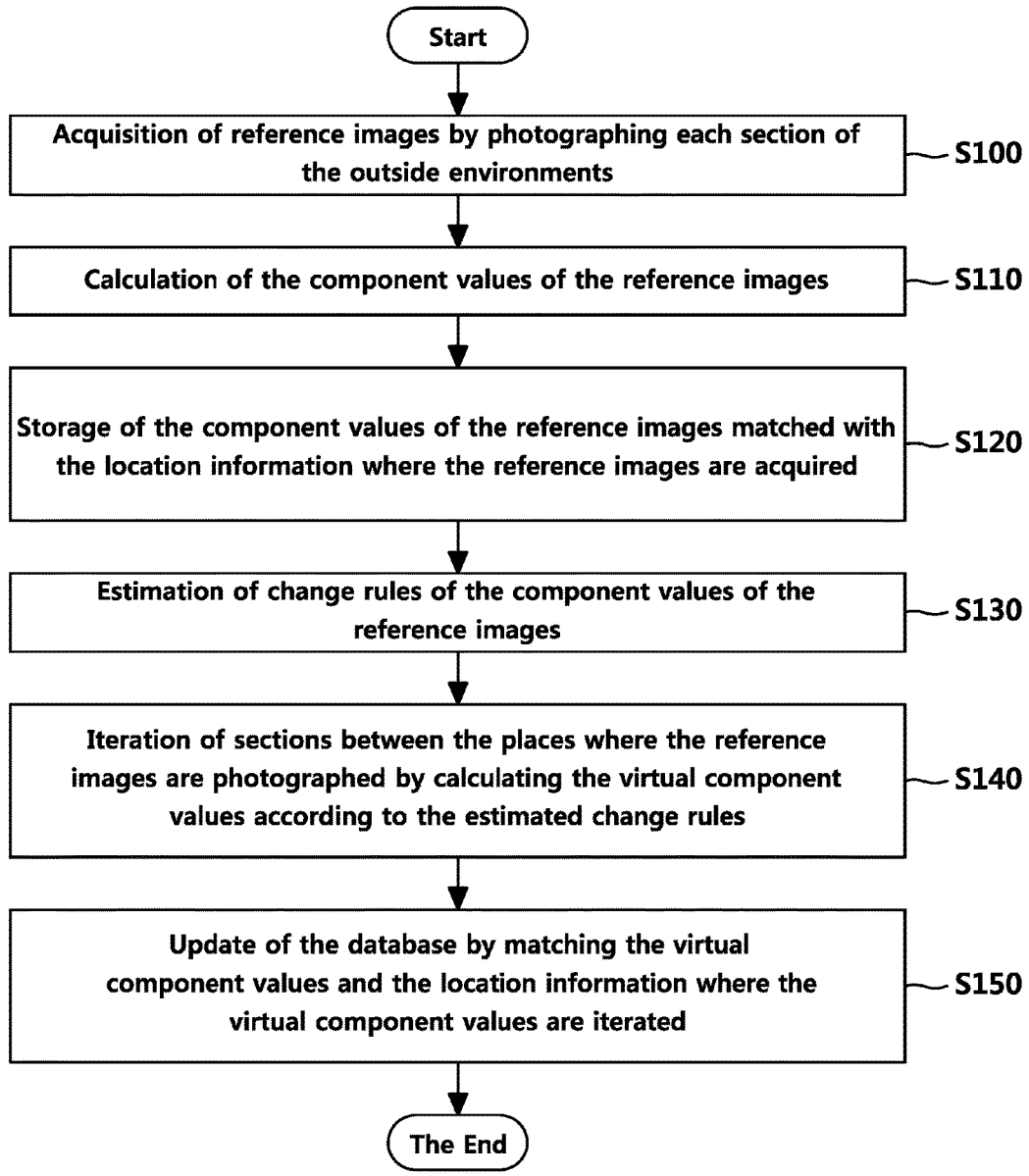
FIG. 2 is a sequence diagram illustrating the method of establishing database according to an exemplary embodiment of the present disclosure.

FIG. 1 is a sequence diagram illustrating the distance measuring method using vision sensor database according to an exemplary embodiment of the present disclosure. FIG. 2 is a sequence diagram illustrating the method how to establish the database according to an exemplary embodiment of the present disclosure.

An exemplary embodiment of the present disclosure is to measure the distance to the object exposed on image by comparing a single image photographed using a vision sensor with the established database of reference image information. The exemplary embodiment of the present disclosure is divided into two main parts. Namely, FIG. 2 illustrates an example of the method of establishing database, and FIG. 1 depicts an example of distance measuring method by comparing with the database in real time.

First, referring to FIG. 2, the database establishment further includes the acquisition of the reference image (S100), the calculation of the reference image characteristics (S110), the storage of reference information (S130), the estimation of the change rules of characteristics (S120), the interpolation (S140) and the update (S150).

The acquisition of the reference image (S100) performs the acquisition of reference image by photographing the outside environment by each section.

More particularly, the acquisition of reference image (S100) obtains a referential image, the reference image, which works as a reference in comparison with images acquired in real time by a user through vision sensor. As it is difficult for a user to establish images in person of all the navigable areas and regions, the reference is prepared in advance on database by acquiring images in each section with a regular distance. Afterward, a user may acquire his/her location information by comparing the real image acquired through vision sensor to the reference image on database.

The calculation of reference image characteristics (S110) performs the calculation of the component values of the reference images acquired in the acquisition of reference image (S100).

More particularly, the calculation of reference image characteristics (S110) performs the calculation of the component values of each reference image acquired in the acquisition of reference image (S100). At this stage, a variety of methods of calculation may be used according to the judgment of a system designer.

This step of the calculation of reference image characteristics (S110) is to extract the component values from the acquired images that are used for the establishment of database. General methodologies are used for the algorithm of the extraction of characteristics by a system designer.

The estimation of the change rules of characteristics (S120) performs the estimation of the change rules of reference image characteristics by deducting the change rules of each component value of consecutive reference images.

The storage of reference image (S130) performs the storage of reference images on database by matching the component values and the location information of the places where the reference image are acquired. Namely, distances, images, and component values are stored on database.

The interpolation (S140) performs the interpolation of the breaks between places where the reference images are photographed by calculating the component values of virtual component values according to the change rules estimated in the estimation of change rules of characteristics (S120).

The interpolation (S140) performs the process of iterating the empty location information between the referential images acquired, keeping a certain distance, in the acquisition of reference image stage (S100). Above all, the determination of the gap in order to fill up the location information affects the accuracy of distance in terms of determining the distance by comparison of component values. For the purpose of improving the accuracy of distance, the interpolation (S140) performs the preparation step of calculating the virtual component values corresponding to empty spaces, using the change rules of component values extracted in the estimation of change rules of characteristics (S120), and the step of filling up the empty location information between acquired reference images. In other words, in the stage of applying algorithm for iterating the middle sections of images, the calculation based on change rules of component values of images is performed as a method for filling up the information about the sparsely distanced middle sections of database information. At this moment, the determination of gaps of image interpolation affects the distance error and determines the efficiency of the system.

The update (S150) performs the updating of database by matching the virtual component values with the location information of where the component values are iterated.

The update (S150) performs the updating of database by matching the virtual component values generated in the interpolation stage (S140) with the location information of empty spaces.

Namely, the update (S150) stage extends the information about distances by updating the database information based on the component values of newly generated images through interpolation.

FIG. 1 is a sequence diagram illustrating distance measuring method using vision sensor database according to an exemplary embodiment of the present disclosure.

Referring to FIG. 1, distance measuring method using vision sensor database according to an exemplary embodiment of the present disclosure includes the acquisition of real image (S10), the calculation of real image characteristics (S30), the selection of reference image (S40), the acquisition of location information (S50), the calculation of distance (S60), and the provision of information (S70).

The acquisition of real image (S10) performs the acquisition of real images by photographing outside environments through vision sensor. The step is performed by a user who intends to acquire his/her location information or the distance information to a particular place. Herein, the vision sensor may be installed in the car where a user is on board or may be installed in the pedestrian navigation device that a walking user carries with him/her. The acquisition of real image (S10) is intended to acquire images in real time by all the image input/output devices that read images to establish database, identical to the acquisition of reference images (S100).

The real images acquired in the acquisition of real images (S10) are transmitted to the management server in the remote place, and the next calculation steps including the estimation of real image characteristics (S30), the selection of reference image (S40), the acquisition of location information (S50), and the estimation of distance (S60) are performed in the management server.

The estimation of real image characteristics (S30) performs the calculation of component values of real images. The same method for the calculation of component values of reference images in the previous stage of establishing database is applied in the calculation of component values of real images.

Namely, the estimation of real image characteristics (S30) performs the extraction of particular components of real images to be compared with the established information on database. The algorithm for characteristic extraction is identical to the methodology used in the database.

The selection of reference image (S40) performs the selection of the reference image that has the component value most similar to the component value of the real image, referring to database. As explained before, the component values of reference images of the outside environments and the location information of these reference images are already stored on database.

More particularly, in the selection of reference image (S40), the comparison of the component values of real images calculated in the estimation of real image characteristics (S30) with the previously established database information is performed. The information with the highest similarity is determined by the comparison, and the way to decide the similarity depends on the judgment of a system designer.

Namely, in the selection of reference image (S40), the process of discovering information with high similarity in comparison with information on database by using the component values of images acquired in the previous stage is performed. For the comparison with the database, the method of comparing distances in order on the database is used.

Figure 4:
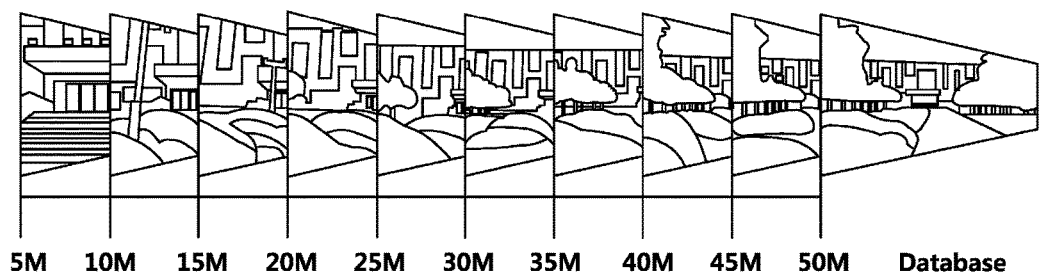
FIG. 4 is a drawing illustrating an instance of distance information of the reference image previously established in the database and the reference image according to an exemplary embodiment of the present disclosure.
Figures 5, 6:
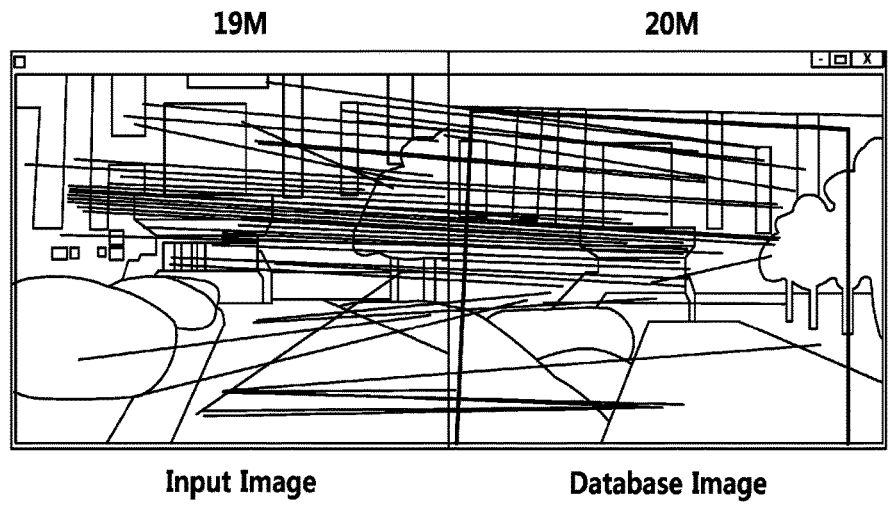
FIG. 5 is a drawing illustrating an example of the method of similarity estimation according to an exemplary embodiment of the present disclosure.
FIG. 6 is a drawing illustrating an example of information provided for a user in the provision of information according to an exemplary embodiment of the present disclosure.

The selection of reference image (S40) compares the real image information with the reference image information previously established on database. At this stage, for the method of comparing images, the image comparison algorithm that has been conventionally used in general may be selectively adopted. According to an exemplary embodiment of the present disclosure in FIG. 4, an example of a reference image previously established on database and an example of distance information of this reference image are illustrated. The estimation of similarity by comparing images is performed as illustrated in FIG. 5.

In the acquisition of location information (S50), the process of acquiring location information of the places where real images are photographed based on the location information of the selected reference image is performed.

In the estimation of distance (S60), the process of calculating the distance between the place where the real image is taken and the target place is performed based on the location information of the place where the real images is taken and the target place.

Figure 3:
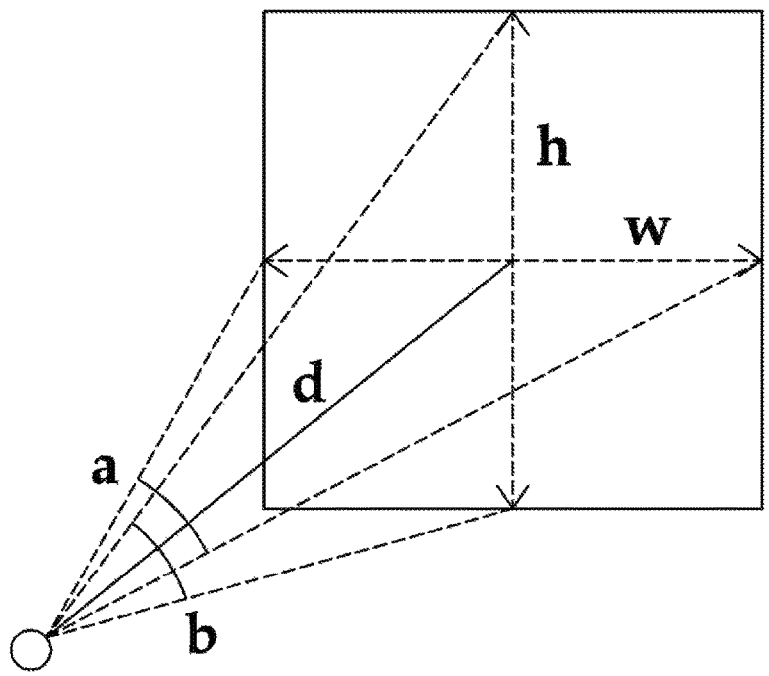
FIG. 3 is a drawing illustrating an example of the method how to calculate the real distance a pixel has according to an exemplary embodiment of the present disclosure.

FIG. 3 is a drawing illustrating an example of the way the real distance of one pixel is determined. Referring to FIG. 3, after the extraction of characteristics from the reference image of the database, the input of the real distance of one pixel is carried out. And the calculation of the real distance per pixel is performed after the extraction of characteristics at the moment of real time input of image. The distance is determined by comparing this to the database.

FIG. 3 shows the distance between the camera view angle and the real recognition area by the letter d, d as a standard, the size of the recognition area is calculated by the following mathematical formulas 1 and 2.

$$w = 2SdS \tan\frac{\alpha}{2} \quad \text{Mathematical Formula 1}$$

$$h = 2SdS \tan\frac{\beta}{2} \quad \text{Mathematical Formula 2}$$

In the above mathematical formulas 1 and 2, according to distance d, the real recognition distance of width direction that one pixel has is w/horizontal resolution, the real recognition distance of horizontal direction is h/vertical resolution.

For instance, when the real distance that an image pixel corresponding to 7 m on database has is 10 cm and the real distance that an image pixel corresponding to 8 m has is 20 cm, the determined distance is about 7.8 m by ratio calculation in case the real distance of the pixel on the real time image is 18 cm.

In provision of information (S70), the process of providing information to a user by processing information including the acquired location information and the distance information is performed. At this stage, the matched information of distance information and acquired image is finally printed out to a user. The format of print is determined by the system designer, and various formats of print such as letters, numbers, drawings, and marks may exist.

Namely, in the case of result output, the final output of the combination of real time images and the compared results with the database is printed for a user. The format of the print may be variously formed by a system designer who constructs the system. In the case of result output, the result may be differentiated according to a user device. FIG. 6 shows the print output result in the user console. As the result illustrated in FIG. 6 shows, various forms of print such as image, console, and text may be possible in the process of printing result.

As the stereo vision method conventionally uses a multiplicity of vision sensor instead of single vision sensor, it is costly and has less efficiency in processing because of the increase in computational complexity for the calculation of distance. Also, the recognition distance of objects is limited for correct distance calculation.

Also, as the distance measuring method by comparing the ratio of a particular object on side-section image compares the ratio of a particular object, it is impossible to calculate distance without a target object and it is only used in limited situations.

However, an exemplary embodiment of the present disclosure efficiently calculates the distance to the target object by comparing the component values of image characteristics previously established on database with the component values of image characteristics acquired through vision sensor. In addition, according to an exemplary embodiment of the present disclosure which determines distance by using single image and DB, it is possible to efficiently determine the distance between a particular object and a car in a functional car.

Also, the present disclosure may be used as a method for the revision of the initial location of GPS. By performing the revision of errors of the initial location of GPS, it may be used as a method for determining the accurate location of a pedestrian. Finally, it may be used for estimating the location of a user by using images acquired on mobile phones.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A distance measuring method using vision sensor database comprising, an acquisition of real images by photographing outside environment using a vision sensor;

a calculation of the component value of the real image characteristics;

a selection of the reference image that has the component value most similar to the component value of the real image characteristic by referring to the database of the component value of reference images of the outside environments and the location information of the reference images;

an acquisition of location information of the place where the real image is photographed based on the location information of the selected reference image; and a measurement of distance between the place where the real image is photographed and the target place based on the location information of the place where the real image is photographed and of the target place wherein the database is established by an establishment of database and the establishment of database comprises, an estimation of change rules of the component value of the reference image characteristics after the calculation of the reference image characteristics an interpolation of sections between places where the reference images are photographed by calculating virtual characteristic component value according to the change rules estimated in the estimation stage; and an updating of the database by matching the virtual characteristic component value with the information of the location where the virtual characteristic component value is calculated by interpolation.

2. The distance measuring method using vision sensor database of claim 1, further comprising a transmission of the acquire real image to the management server between the acquisition of real image and the calculation of the real image characteristics.

3. The distance measuring method using vision sensor database of claim 2,

Wherein the calculation of the real image characteristics, the selection of reference image, the acquisition of location information, the measurement of distance are performed in the management server.

4. The distance measuring method using vision sensor database of claim 1, further comprises, A provision of information to a user by processing the acquired location information and the distance information after the measurement of distance.

5. The distance measuring method using vision sensor database of claim 1,

Wherein the establishment of database comprises, an acquisition of reference images by acquiring reference images by photographing each section of the outside environments;

a calculation of reference image characteristics by calculating the component values of the reference image characteristics; and a storage of reference information by matching the component values of the reference image characteristics and the location information where the reference images are acquired.

* * * * *